United States Patent
McIntyre et al.

(10) Patent No.: US 8,835,816 B2
(45) Date of Patent: Sep. 16, 2014

(54) COOKING METHODS AND A COOKING APPARATUS FOR USE WITH SAME

(75) Inventors: Micahel James McIntyre, Navan (IE); Richard Anthony Devlin, Tarmonbarry (IE)

(73) Assignee: Ovenfeast Limited, Dublin (IE)

(*) Notice: Subject to any disclaimer, the term of this patent is extended or adjusted under 35 U.S.C. 154(b) by 791 days.

(21) Appl. No.: 12/809,444

(22) PCT Filed: Dec. 22, 2008

(86) PCT No.: PCT/EP2008/011013
§ 371 (c)(1),
(2), (4) Date: Oct. 4, 2010

(87) PCT Pub. No.: WO2009/080344
PCT Pub. Date: Jul. 2, 2009

(65) Prior Publication Data
US 2011/0022211 A1    Jan. 27, 2011

(30) Foreign Application Priority Data

Dec. 21, 2007    (IE) .................................. S2007/0936

(51) Int. Cl.
*H05B 1/02* (2006.01)
*H05B 6/68* (2006.01)
*G06Q 50/12* (2012.01)

(52) U.S. Cl.
CPC .............. *H05B 6/688* (2013.01); *G06Q 50/12* (2013.01)
USPC ........... 219/506; 219/708; 219/714; 219/412; 219/492; 99/325; 99/342

(58) Field of Classification Search
CPC ........ H05B 1/02; H05B 6/688; H05B 1/0261; G06Q 50/12

USPC ................. 219/494, 506, 713, 714, 708, 702, 219/412–414, 492; 99/325–333
See application file for complete search history.

(56) References Cited

U.S. PATENT DOCUMENTS

| | | | |
|---|---|---|---|
| 6,552,309 B1 | 4/2003 | Kish et al. | |
| 7,813,831 B2 * | 10/2010 | McCoy et al. | ................ 700/198 |
| 2003/0042253 A1 * | 3/2003 | Ozawa et al. | ................. 219/702 |
| 2004/0146602 A1 * | 7/2004 | Garwood et al. | ............... 426/35 |
| 2007/0068393 A1 * | 3/2007 | Nosler et al. | .................... 99/279 |
| 2009/0130277 A1 * | 5/2009 | Bressner et al. | ............. 426/466 |

FOREIGN PATENT DOCUMENTS

| | | |
|---|---|---|
| JP | 1285714 A | 11/1989 |
| JP | 2004332955 A | 11/2004 |
| JP | 2006288852 A | 10/2006 |

\* cited by examiner

*Primary Examiner* — Mark Paschall
(74) *Attorney, Agent, or Firm* — Hoffmann & Baron, LLP

(57) ABSTRACT

The present invention relates to a cooking control method performed by a cooking apparatus for a food item. The method comprises obtaining a unique identifier and cooking data for the food item, and checking for a record of the unique identifier in a memory of the cooking apparatus. If a record of the unique identifier is located in the memory, then the cooking apparatus will not cook the food item. Otherwise a cooking process based on the cooking data to cook the food item is performed. Accordingly, cooking data for a given instance of a food item can only be used once in order to activate a cooking process performed by the cooking apparatus. The present invention also features product recall as well as the ability to track food item sales via a cooking data communications system.

22 Claims, 5 Drawing Sheets

COOKING METHODS AND A COOKING APPARATUS FOR USE WITH SAME

This application is the U.S. National Phase of, and Applicants claim priority from, International Application Number PCT/EP2008/011013 filed 22 Dec. 2008 and Irish Patent Application No. S2007/0936 filed 21 Dec. 2007, each of which are incorporated herein by reference.

BACKGROUND OF THE INVENTION

The present invention relates to a cooking apparatus and method. More particularly, the present invention relates to a method for cooking a food item, and a cooking apparatus for use with the cooking method.

Various types of ovens for cooking food items are known. With certain categories of ovens operatives are required to manually interact with oven controls in order provide the necessary input to the oven so that it will cook a food item as is required. Such ovens can also include pre-programmed or stored cooking processes for various food items so that to cook a food item an operative needs to manually select an appropriate cooking process based on the type of food item to be cooked.

Other categories of oven are adapted to receive the required input through the use of barcodes or tags attached to a food item, the bar code or tag encoding or storing cooking data for the food item. These ovens typically comprise or are coupled to a bar code or tag reader which is used to receive and transmit the cooking data encoded in the barcode to a controller, the controller in turn controlling heating times and output levels of the oven based on the cooking data so that the cooking of food is carried out.

However, in commercial environments, including retail outlets, the cooking of food items based on such processing suffers from a number of drawbacks. One major problem is a lack of control over the re-use of cooking data, wherein it is common place for operatives to use barcodes or tags on the packaging of one food item, such as a sausage roll, to activate a cooking process for a second often quite different food item, such as a raw chicken pie. Clearly cooking data for heating a pre-cooked sausage roll is very different from cooking data needed for activating a cooking process for a raw chicken pie, both in terms of the required heating time and output levels needed. The re-use of such cooking data may occur for a number of reasons, including that, and using the above example, the raw chicken pie was never intended to be cooked by an operative using the oven, or that the barcode or tag on the chicken pie has been damaged or defaced, removed or even inadvertently not affixed to the food packaging during the initial product preparations. It will be appreciated that when relying on predefined cooking processes to cook a food item the quality of any food product which has not been cooked precisely according to the correct cooking data suited to the product will clearly be inferior, and will quite often lead to serious cases of food poisoning.

Additional problems with the prior art cooking apparatuses resides in their inherent inability to deal with the recall and traceability of food items. Product recall is necessary when a food item is inadvertently contaminated during preparation or when ingredients used in the preparations are somehow contaminated.

It would thus be desirable for a cooking method and cooking apparatus which will go someway towards overcoming the above problems, and/or which will provide the public and/or industry with a useful alternative.

SUMMARY OF THE INVENTION

It is acknowledged that the term 'comprise' may, under varying jurisdictions be provided with either an exclusive or inclusive meaning. For the purpose of this specification, and unless otherwise noted explicitly, the term comprise shall have an inclusive meaning—i.e. that it may be taken to mean an inclusion of not only the listed components it directly references, but also other non-specified components. Accordingly, the term 'comprise' is to be attributed with as broad an interpretation as possible within any given jurisdiction and this rationale should also be used when the terms 'comprised' and/or 'comprising' are used.

Further aspects of the present invention will become apparent form the ensuing description which is given by way of example only.

Accordingly, in a first aspect there is provided a cooking control method performable by a cooking apparatus on a food item comprising the steps of:

obtaining a unique identifier and cooking data for the food item, and checking for a record of the unique identifier in a memory of the cooking apparatus, and if a record of the unique identifier is located in the memory then a cooking process is not performed by the cooking apparatus and the food item is not cooked, but, if a record of the unique identifier is not located in the memory, then performing the step of:

controlling the cooking apparatus to perform a cooking process based on the cooking data to cook the food item.

In a second aspect there is provided a cooking apparatus for a food item comprising:

input means for obtaining a unique identifier and cooking data for the food item, and cooking control means for checking for a record of the unique identifier in a memory of the cooking apparatus, and if a record of the unique identifier is located in the memory then the cooking control means is adapted to control the cooking apparatus so that a cooking process is not performed, but if a record of the unique identifier is not located in the memory, the cooking control means is adapted to control the cooking apparatus to perform a cooking process based on the cooking data to cook the food item.

In a third aspect there is provided a cooking data communications system comprising at least one cooking apparatus, in which the or each cooking apparatus is coupled to a central communications server via a communications network, and at least one user computer is coupled to the central communications server, and wherein, the central communications server is adapted for controlling data communications between each cooking apparatus and user computer.

Further advantageous effects of the present invention are achieved by the embodiments set out in the dependent claims.

The present invention provides a cooking control method and cooking apparatus adapted for storing the unique identifier of a cooked food item. This ensures that a cooking process will only be activated for food items associated with a previously unread unique identifier. Accordingly, cooking data for a given instance of a food item can only be used once in order to activate a cooking process performed by the cooking apparatus. Since no two food items will have the same identifier if an operative attempts to re-use a previously read identifier to cook a food item then the cooking apparatus will not perform a cooking process based on the cooking data to cook the food item. Instead, the cooking apparatus will generate a visual and/or audible signal or message on a user interface or display of the cooking apparatus to the effect that the food item has already been cooked. Once a cooking process has been completed the cooking apparatus only retains in its storage memory the unique identifier of the food item so it can then reference this record to ensure that a cooking process is initiated for the unique identifier only once.

Furthermore, if a food item has been recalled by the manufacturer the cooking apparatus will not cook the item since the memory of the apparatus will have received and will store in memory a record of the unique identifier, thereby preventing cooking of the food item.

The application of a unique identifier for each food item also ensures that each food item is uniquely traceable within a cooking data communications system. This enables features such as product recall as well as the ability to track food item sales via the system.

Furthermore, the cooking apparatus may reject a food item for cooking if the date on which the food item is attempted to be cooked is beyond the food items sell by date. Additionally, the cooking apparatus may reject a food item for cooking if an attempt is made to cook more than one food item wherein the food items are incompatible, that is, they are unable to be cooked together, or if the brand of the food is unable to be cooked in the oven or if an attempt is made to cook too many food items together.

Additional advantages follow from the compensation features of the present invention, including that a cooking process will automatically be adjusted depending on the input voltage variation from a predefined range. If there is a temperature loss in the cooking cavity, such as if the cooking apparatus door is opened during the cooking process a correction factor is applied to compensate for lost energy. If two or more food items are scanned then an appropriate correction is made to the cooking process. Each food item also has associated cooking instructions which includes a cook index. Such a cook index being specific to the type (composition) of a food item and enables products of different weights of the same composition, or similar composition to be cooked according to the index number. Such an index number will be encoded in the cooking instructions to cook the food item as required. Once that cooking process is complete the oven only records in memory that the event has taken place, and this is done by recording the unique identifier. Such a feature also allows for regular changes to be made to the cooking processes which are to be performed by the cooking apparatus since all cooking data may be encoded in a barcode applied to the packaging or an RFID tag, and it is this stored information which is dynamically converted into a cooking process by conversion means associated with the cooking apparatus.

It will be understood that a barcode in the context of the present invention may be or is any optical machine readable representation of data, and may be a linear barcode (i.e. one dimensional) or a patterned barcode (i.e. two dimensional).

Each food item also has a cook index number and this is printed on the packaging or a food item tag. Such a cook index number is specific to the type (composition) of a food item and enables products of different weights of the same composition, or similar composition to be cooked according to the index number. A food item may be manually cooked by inputting the cook index number on an input keypad provided on the cooking apparatus. To initiate a cooking process according to the bar code on the food item packaging, the index number is thus inputted into the keypad by an operative. To activate the keypad to facilitate its use for receiving the index number an approval code is first transmitted to the cooking apparatus (such as from a system administrator), the approval code encoding a set of instructions to allow activation of the key pad. In the event that the reader is unsuitable or the connection between the reader and the cooking apparatus controller is broken, then the use of the cook index number can be used to manually cook a food item. Use of cook index in manual mode is a temporary measure only and oven will default to automatic mode on oven shut down.

It will be understood that a suitable cooking apparatus for use with the present invention would be an oven with combination microwave and convection cooking, as well as a steamer oven. The cooking elements may comprise two fan-assisted convection elements and one or more microwave magnetron(s). These are controlled by a main circuit board which connects to a smaller display board carrying a bespoke VFD (vacuum fluorescent display) and an interface to two front-panel membrane switch sub-assemblies.

In instances of the cooking apparatus being a steamer oven the use of a plurality of individually controlled magnetrons (such as three magnetrons) at various power setting is used to gain the desired result. Food items intended to be cooked in the steam oven will be manufactured with a specific moisture content to generate the steam. A cooking process based on cooking data for a food item will use either one, two or all three magnetrons at various power levels to apply the energy to the product to generate steam within the product and packaging of the product. The ability to individually control the power levels, activation time and the positioning of the magnetrons within the apparatus removes the necessity to manually stir a food product during a cook cycle thus preventing cold spots normally associated with this type of microwave cooking. Such a steamer oven does not require any water connections as the steam is generated by the water in the food item. The distinct advantage of such a steam oven over a conventional microwave is the ability to control each magnetron separately by the use of specific cooking data in the unique product identifier tag, such as the barcode or RFID tag.

The present invention thus requires an oven that can be controlled by the contents of encoded data in a food item barcode or RFID tag, and that can exchange data with the central communications server for the purposes of stock control and diagnostics. Communications for the cooking data communication system for the present invention utilise a GPRS service supported by GSM cell-phone providers. The cooking apparatus is thus an oven which is adapted to interpret cooking data affixed to food items to be cooked and initiate a customised cooking process for that food item. The cooking apparatus also comprises a cooking control means which utilises a modem to communicate stock, recall and diagnostics data with the central communications server. The use of unique identifiers provides the means for facilitating a system in which provides for distribution tracking, raising orders, delivery dockets, invoices and other such reports, and diagnostics aids.

It will be understood that the central communications controller attendant in the cooking data communications system comprise computing hardware, database software and a web-based user interface, either shared between all end users or replicated for each end user.

The cooking apparatus is further adapted to shutdown once a cooking cycle is complete if the cooked food item is not removed from the oven in a predetermined time. The automatic shutdown will occur after a lapsed time determined by the oven software based on the food item that has been cooked. For example, bread products which could have a tendency to ignite and cause fire will cause the oven to shut down sooner than a wet dish item like a main meal. This feature prevents fire and smoke generation and acts as a safety feature not available in similar type combination convection ovens which operate with a preset cavity temperature. The benefit of this feature is fire safety as after automatic shutdown all power is removed from the heating elements and a message is displayed on the display of the cooking apparatus to open oven door and discard all items.

The cooking apparatus of the present invention is also adapted for use by the elderly in the home. Such an apparatus will combine all of the above features with the additional feature that if a food product is not removed from the cooking apparatus when cooked, then after a specified time the cooking apparatus will transmit a signal or post a call to the user's mobile phone or landline as a reminder that the food item is ready. If the food item is not removed, then a call to the next of kin, carer or emergency services can be made. Additionally, the cooking apparatus will call a carer or the next of kin if nothing has been cooked all day.

BRIEF DESCRIPTION OF THE DRAWINGS

The invention will be more clearly understood from the following description of some embodiments thereof, given by way of example only, with reference to the accompanying drawings, in which.

DETAILED DESCRIPTION OF THE INVENTION

Figure 1:
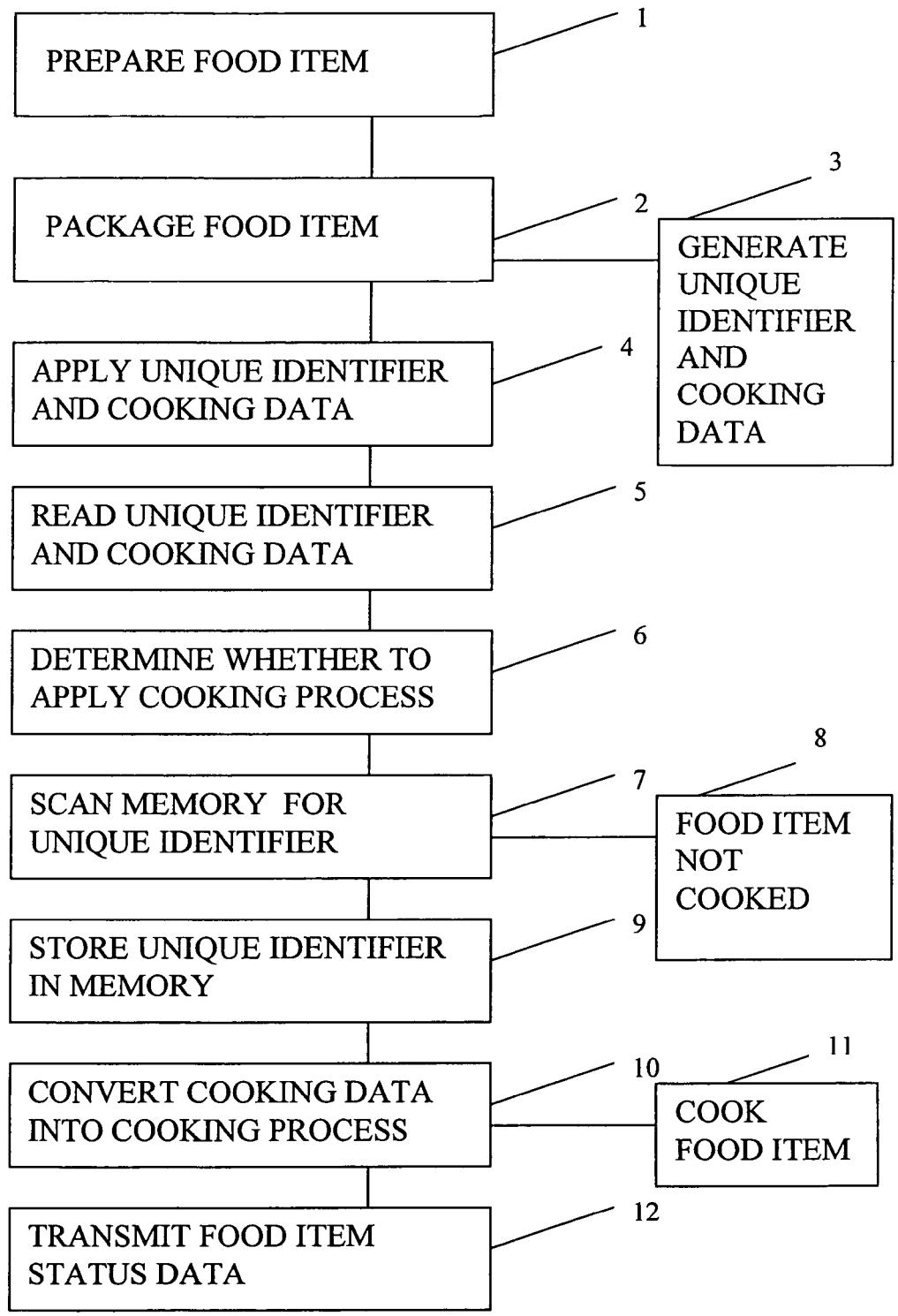
FIG. 1 is a flow diagram showing the steps in a cooking method according to the present invention.

Referring to the drawings, and initially to FIG. 1, there is shown a flow diagram providing the steps in a cooking control method according to the present invention. At step 1, a food item to be cooked is prepared. This step will involve numerous sub-stages, including the selection of ingredients, the preparation of those ingredients as well as any initial pre-cooking of the food item and the performance of checks on the food item to ensure that it conforms with any quality assurance requirements which may be necessary. At step 2, the prepared food item is packaged.

At step 3, a unique identifier and cooking information for the food item is generated, and at step 4, a barcode encoding the unique identifier and cooking data is applied on the packaging. The unique identifier may be formatted to be an encoded batch code together with a serial number which is unique to the instance of the food item. No two food items, even if they are the same product, will have the same unique identifier. The cooking data applied to the packaging includes cooking apparatus compatibility data, combination cooking data, temperature range data, weight range data, cooking apparatus power level data, and stage cooking data. Compatibility data describe how a food item can be cooked together with other items, for example some items must be cooked individually, others can be cooked in combination with only certain other product types, and others may be cooked only in specified cooking apparatus which are suitable having regard to the nature of the food item. The cooking information is computed according to the specific characteristics of the food item being cooked, including the food item ingredients, fat content sugar content, ratio of fats to solids, water content, particle size, density, quid, and overall shape, weight and size of the food item. Also applied on the packaging is food item status information which may comprise one or more of a food item sell by date, a brand identifier for the food item and/or a food item batch identifier.

Although reference in step 4 is to the use of barcodes (such as one dimensional or two dimensional barcode) for encoding the unique identifier and cooking data, it will be understood that this information can be associated with a food item in a number of different ways. For example, it can be stored in a radio-frequency identification (RFID) tag applied to the food item, or it can be manually inputted by a user with the use of a input keypad located on the cooking apparatus, and or it can be received into a data input port of the cooking apparatus adapted for receiving data via a wired or wireless transmission network coupled between the cooking apparatus and a computing server. Reference to the use of barcodes should thus in no way be seen as limiting on the manner in which the unique identifier and cooking data is applied to the food item for subsequent input to the cooking apparatus.

At step 5, when the food item is to be cooked by a cooking apparatus, the unique identifier and the cooking data are read by an input means, such as a barcode reader, coupled to the cooking apparatus. At step 6, the unique identifier is used to determine whether a cooking process based on the cooking data is to be performed by the cooking apparatus. Such a determination involves, at step 7, a cooking control means of the cooking apparatus scanning a memory of the cooking apparatus for a record of the unique identifier read by the input means. If the unique identifier is located in the memory this indicates that the unique identifier has previously been read by the cooking apparatus, and that therefore a food item having that unique identifier has been cooked on a previous occasion. This step may further comprise checking for a record of the unique identifier in memory of any of a plurality of cooking apparatuses linked together via a communications network, or for a record of the unique identifier in a memory of a central communications server linked to the cooking apparatus.

Thus, if the presence of the unique identifier for the food item is detected at step 7, then the cooking apparatus does not perform the cooking process, with the result that the food item is not cooked at step 8 and a message that the food item will not be cooked is output on the display means of the cooking apparatus. A log of the failed attempt to cook the food item is optionally maintained by storing a further record of the unique identification in the memory and/or sending the record to a central communications server.

Conversely, if the unique identifier is not located in the memory at step 7, then it is determined that the cooking process is to be performed. A record of the unique identifier in then stored in the memory at step 9, and the cooking data is converted into a cooking process to be performed by the cooking apparatus at step 10. The food item is then cooked according to the cooking process at step 11. If unique identifiers for two or more food items are read, and both identifiers are not located in the memory during the determination/checking step 6, then the cooking apparatus may also generate a combination cooking process enabling the two or more food items to be cooked at the same time by the cooking apparatus.

Once the food item has been cooked, food item status data is transmitted at step 12 to a central communications server. Such food item status data will include data indicating that the food item corresponding to the unique identifier has been cooked.

Figure 2:
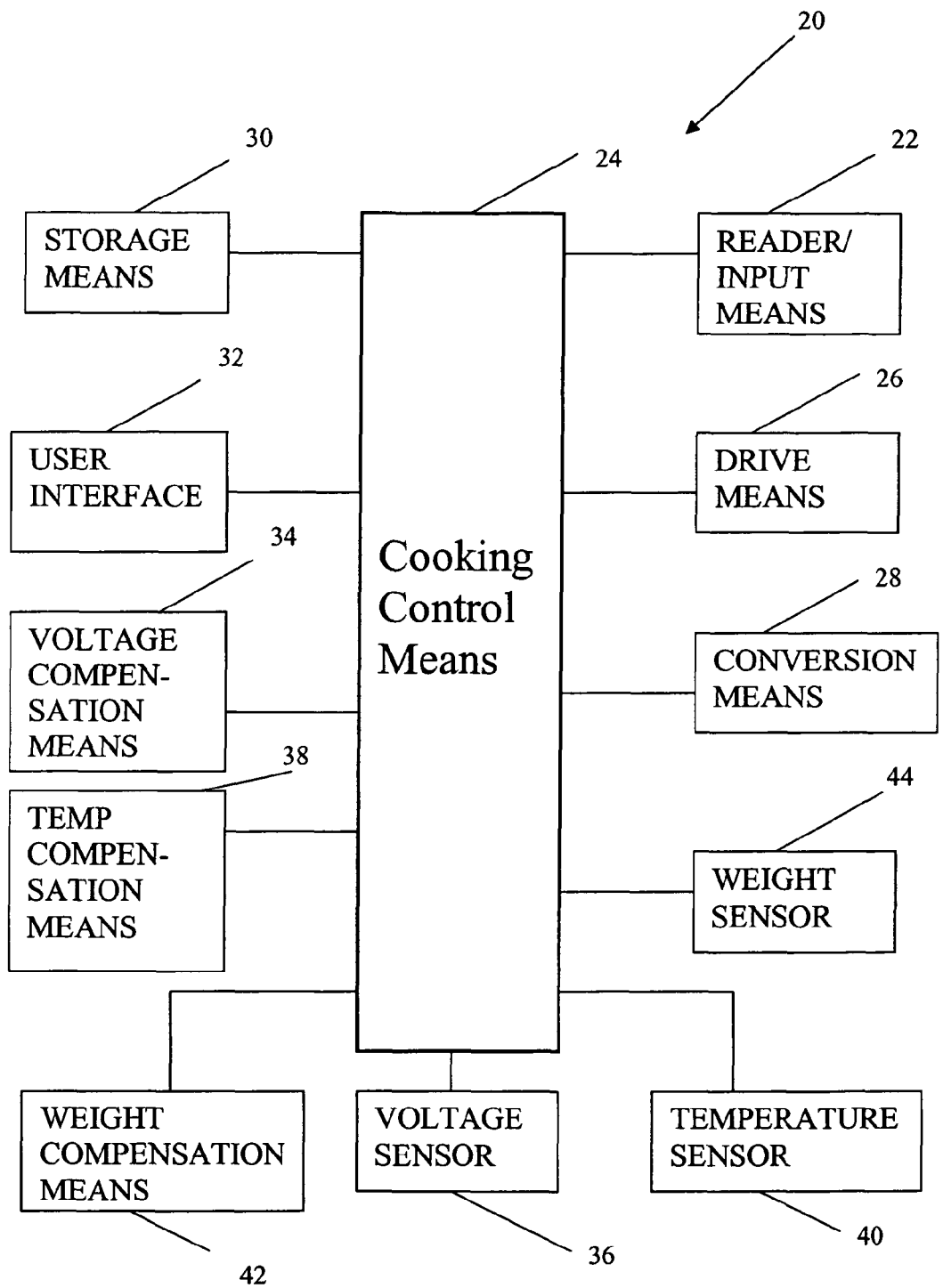
FIG. 2 is a block schematic of components in a cooking apparatus for use in performing the cooking method according to FIG. 1.

With reference to FIG. 2, shown are components in a cooking apparatus 20 for use when performing the cooking method according to FIG. 1. The cooking apparatus 20 comprises input means 22 for obtaining a unique identifier and cooking information on packaging applied to the food item. The input means 22 may be a barcode reader for reading a barcode encoding the unique identifier and cooking data applied to packaging for the food item; a radio frequency transceiver means for receiving the unique identifier and the cooking information from a radio-frequency identification (RFID) tag applied to the food item, a input keypad located on the cooking apparatus, and/or a data input port for receiving the unique identifier and cooking data via a wired or wireless transmission network coupled between the cooking apparatus and a computing server.

Also shown is cooking control means 24, which is a data processor for controlling the cooking apparatus. Such a control means 24 will have functionality for processing the unique identifier and for scanning a memory or storage means 30 of the cooking apparatus. The control means 24 will also control the cooking apparatus to perform a cooking process based on cooking data. The cooking apparatus may also include a drive means 26 which drives a magnetron for cooking a food item according to the cooking data for the food item. The cooking control means 24 is further coupled to cooking data conversion means 28 for converting the cooking data into the cooking process performed by the drive means 26. The cooking information conversion means 28 is further adapted to generate a combination cooking process when the unique identifier and the cooking data for two or more food items are read, the combination cooking process enabling the two or more food items to be cooked at the same time by the cooking apparatus. Also shown is a storage means 30 which operates as a memory for storing a unique identifier if it is determined that a cooking process is to be performed. The storage means 30 may be coupled locally to the cooking control means 24 of the cooking apparatus, or may alternatively be located remotely and thus connected to the cooking apparatus 20 via a communications network. The cooking apparatus 20 will also include a user interface 32 which is formed as an operator panel and includes external switches and a visual display means for displaying messages to a user.

Although not shown, it will be understood that the cooking apparatus 20 also includes a main body which defines an external appearance of the cooking apparatus, a cooking cavity in the main body in which is cooked a food item and a door for closing the cooking cavity The cooking apparatus 20 further includes voltage compensation means 34 for adjusting the cooking process to compensate for a variation in voltage input received by the cooking apparatus 20 from a predefined voltage range. To enable such functionality the cooking apparatus 20 also comprises voltage sensing means 36 to determine voltage input received by the cooking apparatus 20. Also shown is temperature compensation means 38 for adjusting a cooking process to compensate for a variation in temperature in a cooking cavity of the cooking apparatus from a predefined cooking temperature range for a food item. Use of temperature sensing means 40, in conjunction with the cooking control means 24 may be used to determine the operating temperature within the cooking cavity and therefore the variation in the temperature in the cooking cavity from the predefined cooking temperature range. Additionally, the cooking apparatus 20 comprises food weight compensation means 42 for adjusting the cooking process to compensate for a variation in weight of a food item from a predefined cooking weight range for the food item. To determine the weight of the food item and the variation in the weight of the food item from the predefined cooking weight range for the food item the cooking apparatus comprises weight sensing means 44.

Figure 3:
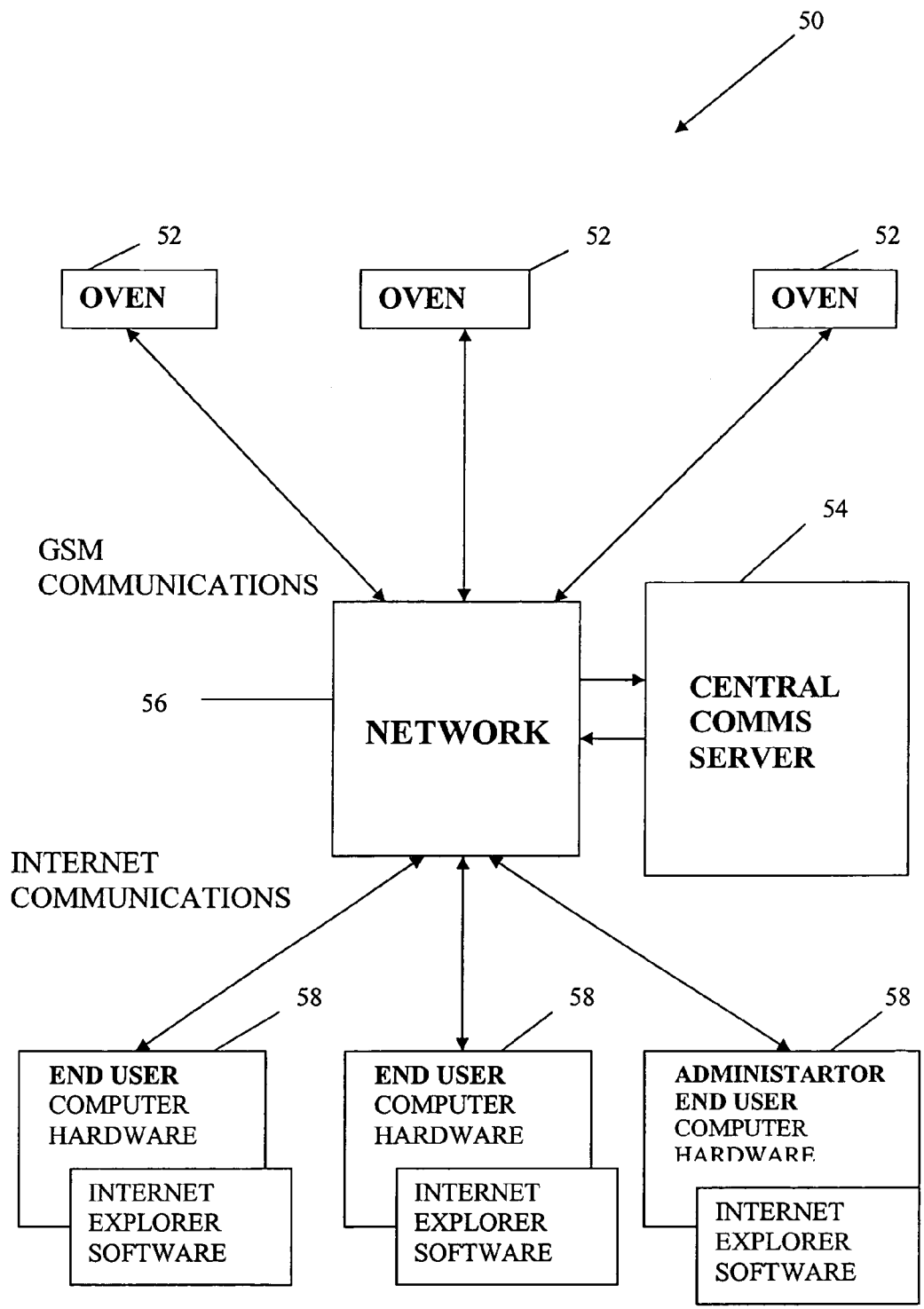
FIG. 3 is block schematic showing a cooking data communications system according to a further aspect of the present invention, the cooking system comprising a plurality of the cooking apparatus of FIG. 2.

FIG. 3 shows a cooking data communications system 50 according to a further aspect of the present invention. The cooking data communications system 50 comprises a plurality of cooking apparatuses, indicated ovens 52. The cooking apparatuses 52 are coupled to a central communications server 54 via a communications network 56. A plurality of user computers 58 are coupled to the central communications server 54 such that the central communications controller 54 is adapted for controlling data communications between the cooking apparatuses 52 and the user computers 58. Each cooking apparatus 52 comprises means, such as a GSM/GPRS data modem, to transmit and receive data to and from the central communications server 54. In the instance shown, the central communications server 54 is a web-server and communications between each cooking apparatus and the central communications system is via the Internet, although such communications could equally be implemented using a LAN The cooking data communications system 50 facilitates the transmission of food item status data from each cooking apparatus 52 to the central communications controller 54. Such data may be used by the central communications controller 54 to update information stored relating to a food item, such as that a food item has been cooked. Additionally, the central communications controller 54 is adapted to transmit data to each cooking apparatus, such as if a food item has been recalled.

Figure 4:
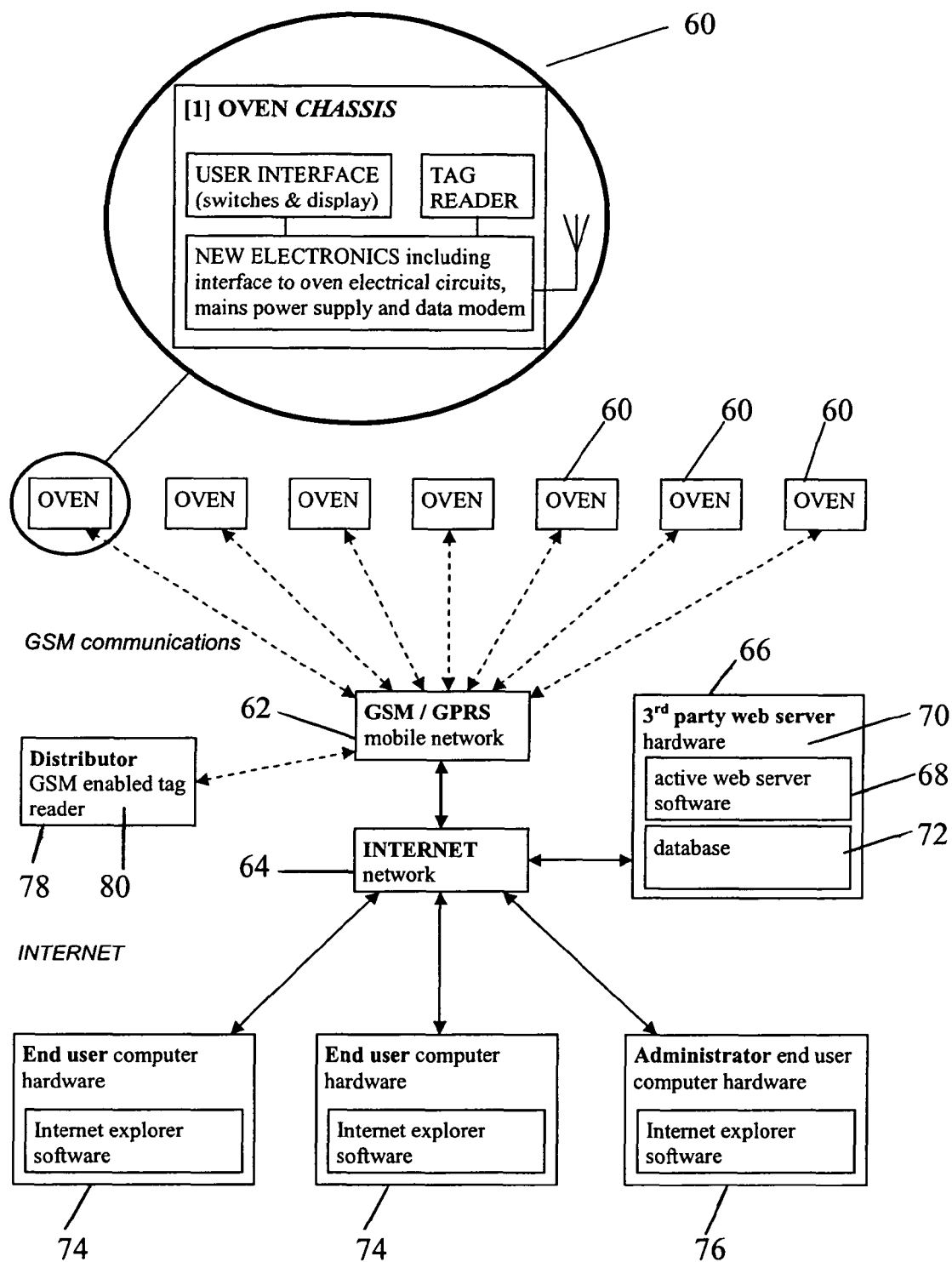
FIG. 4 is a stylised schematic showing the cooking data communications system of FIG. 3.

FIG. 4 is stylised schematic of FIG. 3. showing multiple cooking apparatuses, indicated as ovens 60, which communicate via a cell-phone provider's existing GSM/GPRS network 62 and the Internet 64 to a central web server 66. The web server 66 executes software 68 which runs on computer hardware 70. The software 68 contains or is connected to a database 72 which stores the current state and history of the system of the ovens 60 and their transactions (such as orders, deliveries, invoices, faults and the like.). The web server 66 is accessed by multiple end-users 74 via any Internet enabled computer using an Internet browser. Access to specific information may also be is limited with the use of authentication means, such as account username/password prompts. End users can therefore hide pertinent data or generate orders, delivery dockets, invoices and/or reports. End-users may include distribution staff responsible for supplying the food items and the retailers in whose premises the ovens 60 are installed. Also shown is web administrator 76 which has access to the web server 66 in the same way as user computers 74, but using a special account which grants administrator privileges. It will be understood that an administrator 76 is a concept that describes a user with special privileges. Optionally, distributors 78 are provided with a GSM enabled tag reader 80 so that packaged food items can be automatically tracked during distribution.

Figure 5:
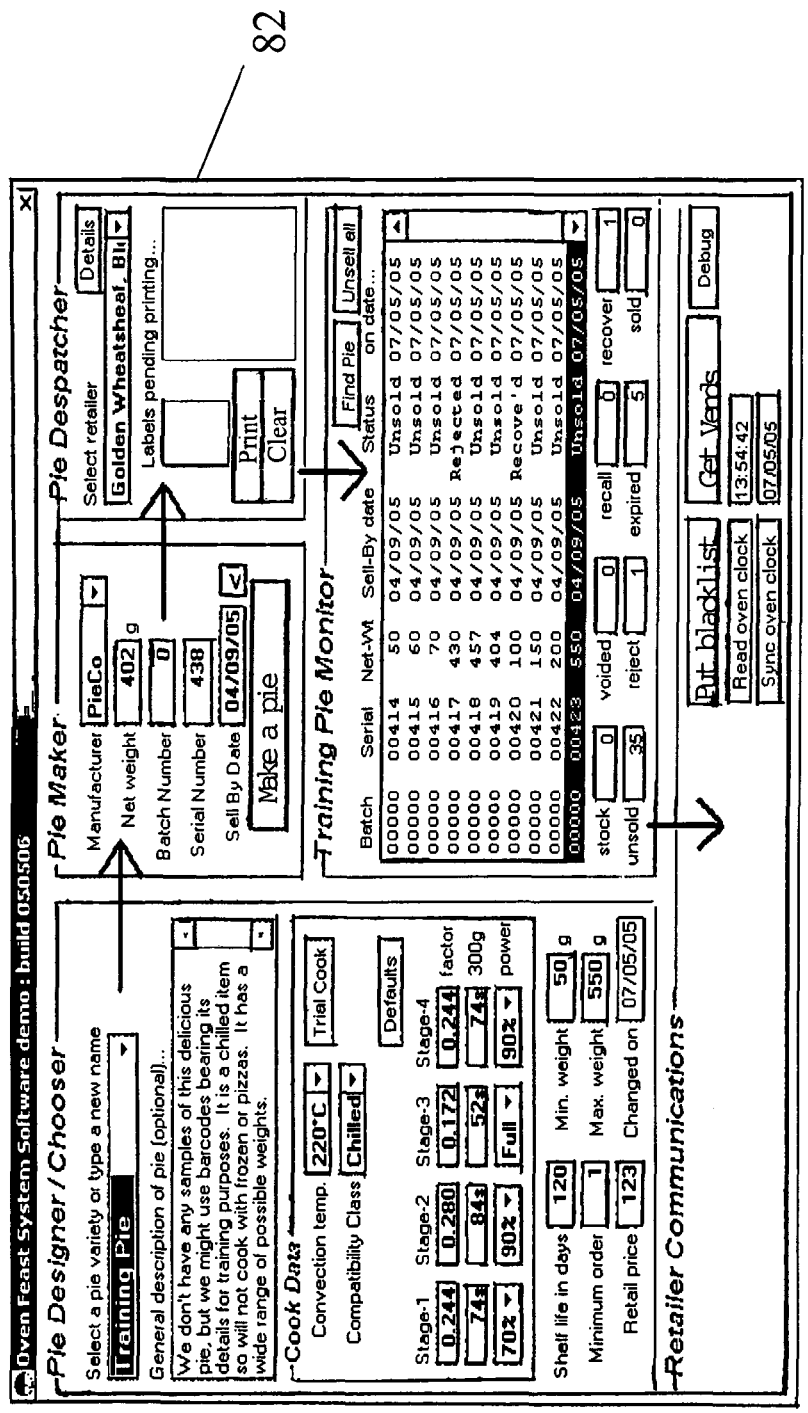
FIG. 5 is a screenshot of a user interface for generating barcodes for use with the present invention.

A further feature of the present invention relates to the mechanism by which the barcodes are made available to operatives for application to food item packaging. Once the required cooking information has been established for a particular food item or range of food items, this information is fixed and applied to a range of similar products of varying weights within a weight band. The cooking information is fixed and stored on the web-server 66. In operation, a manufacturer requests a set of barcodes from the web-server 66 and inputs certain fields such as best before date and batch number. A user interface 82 providing such functionality is shown in FIG. 5. The web-server 66 thus assigns a unique identifier to each barcode and then the web-server authorises these barcodes and sends them to the manufacturer. The manufacturer prints and applies the barcodes to the packaging of a food item. The manufacturer then scans the barcodes to verify them and this verification data is sent back to the web-server where it is cross-referenced with the earlier request for the barcode from the manufacturer. The web-server 66 deems these barcodes to be in distribution so that once the barcode is read by a reader associated with the cooking apparatus it is either recorded as cooked, rejected, or recalled. Such food item status information is transmitted to the server to facilitate automatic tracking of food items until the time they are either recalled or cooked at a retail outlet premises.

Use of a food item batch identifier by the present invention also facilitates the implementation of a highly effective food item recall scheme. When a batch of food items is desired to be recalled, such as if the batch of food items is contaminated, a signal encoding the food item batch identifier for the batch is sent to the memory of each cooking apparatus. The central communications server is thus adapted to transmit a record comprising a unique identifier for a recalled food item into the memory of each cooking apparatus coupled to the network so that a cooking process is not able to be performed by any cooking apparatus in the network for the recalled food item. When a food item having the food item batch identifier in its unique identifier is obtained by a cooking apparatus reader then the cooking apparatus will not apply the cooking data encoded in the barcode and will thus not cook the food item and will instead display a message on the display of the cooking apparatus that the food item is on recall and to contact the supplier. As the cooking apparatus is adapted to store a record of the unique identifier for each food item cooked, it is also possible to cross reference this information with the food item batch identifier to identify the date, time and location for each food item that has been cooked. Such a feature would be helpful to the relevant authorities to identify where and when a contaminated food item was cooked and therefore consumed. It will also facilitate identification of a consumer by means of restaurant records, credit card payments and the like, as well as being able to immediately identify remaining stocks of unsold food items that may be in storage or currently being distributed.

The central communications server is adapted to transmit amended cooking data to the memory of each cooking apparatus coupled to the network so that a cooking process performed by the cooking apparatus is based on the amended cooking data instead of the cooking data originally applied to the food item. This is particularly useful if an error in the cooking data has been made during the original processing of the food item, such as when a barcode of RFID tag is affixed to food item packaging, and avoids the need to do a total recall of the food item to amend the incorrect cooking data.

The web-server 66 also facilitates the generation of pertinent reports, including retailer, delivery docket, retailer invoice, order, fault and status reports on all retailers by region and on all distributors.

The web-server 66 is also adapted to provide a real-time diagnostics interface to each oven 60, and this includes the ability to take control of the oven and to receive information concerning its pertinent parameters such as cavity temperature, well-being of heating elements and the like. Additional background diagnostics are carried on each oven periodically and data concerning the status of an oven is transmitted to the administrator 76.

Aspects of the present invention have been described by way of example only and it should be appreciated that additions and/or modifications may be made thereto without departing from the scope thereof as defined in the appended claims.

The invention claimed is:

1. A cooking apparatus for a food item comprising:
input means for obtaining a unique identifier and cooking data for the food item, and
cooking control means for checking for a record of the unique identifier in a memory of the cooking apparatus, and if a record of the unique identifier is located in the memory then the cooking control means is adapted to control the cooking apparatus so that a cooking process is not performed and the food item is not cooked, but if a record of the unique identifier is not located in the memory, the cooking control means is adapted to control the cooking apparatus to perform a cooking process based on the cooking data to cook the food item,
conversion means for converting the cooking data into the cooking process performed by the cooking apparatus, and automatically generate a combination cooking process when the unique identifiers for two or more food items are read, the combination cooking process enabling the two or more food items to be cooked at the same time by the cooking apparatus.

2. A cooking apparatus as claimed in claim 1, in which the cooking control means is adapted to store the obtained unique identifier in the memory of the cooking apparatus.

3. A cooking apparatus as claimed in claim 1, in which the cooking control means is adapted to cause the cooking apparatus to shut down if a food item that has been cooked is not removed from the cooking apparatus within a predetermined amount of time.

4. A cooking apparatus as claimed in claim 1, in which the input means comprises one or more of:
a barcode reader for reading a barcode encoding the unique identifier and cooking data applied to packaging for the food item;
a radio frequency transceiver means for receiving the unique identifier and the cooking information from a radio-frequency identification (RFID) tag applied to the food item;
a input keypad located on the cooking apparatus, and
a data input port for receiving the unique identifier and cooking data via a wired or wireless transmission network coupled between the cooking apparatus and a computing server.

5. A cooking apparatus as claimed in claim 1, in which the cooking control means is adapted to check for a record of the unique identifier in memory of any of a plurality of cooking apparatuses linked together via a communications network.

6. A cooking control method as claimed in claim 1, in which the cooking control means is adapted to check for a record of the unique identifier in a memory of a central communications server linked to the cooking apparatus.

7. A cooking apparatus as claimed in claim 1, further comprising voltage sensing means to sense voltage input being received by cooking apparatus and to determine a variation between the sensed voltage from a predefined input voltage range required to power the cooking apparatus.

8. A cooking apparatus as claimed in claim 7, further comprising voltage compensation means for automatically adjusting the cooking process to compensate for the variation in input voltage.

9. A cooking apparatus as claimed in claim 1, further comprising temperature sensing means to sense a temperature in a cooking cavity of the cooking apparatus and to determine a variation between the sensed temperature from a cooking temperature range in the cooking data for the food item.

10. A cooking apparatus as claimed in claim 9, further comprising temperature compensation means for automatically adjusting the cooking process to compensate for a variation in the temperature.

11. A cooking apparatus as claimed in claim 1, in which the cooking apparatus further comprises weight sensing means to determine a weight of the food item and a variation in the weight of the food item from a weight range in the cooking data for the food item.

12. A cooking apparatus as claimed in claim 11, further comprising food weight compensation means for automatically adjusting the cooking process to compensate for the variation in weight of the food item.

13. A cooking apparatus as claimed in claim 1, in which the cooking data comprises one or more of:
   cooking apparatus compatibility data;
   combination cooking data;
   temperature range data;
   weight range data;
   cooking apparatus power level data, and
   stage cooking data.

14. A cooking apparatus as claimed in claim 1, in which the memory of the cooking apparatus is coupled locally to the cooking control means.

15. A cooking apparatus as claimed in claim 1, in which the memory of the cooking apparatus is coupled remotely from the cooking control means.

16. A cooking data communications system comprising at least one cooking apparatus as claimed in claim 1,
   in which the or each cooking apparatus is coupled to a central communications server via a communications network, and
   at least one user computer is coupled to the central communications server, and
   wherein, the central communications server is adapted for controlling data communications between each cooking apparatus and user computer.

17. A cooking data communications system as claimed in claim 16, in which each cooking apparatus is adapted transmit and receive data from the central communications controller.

18. A cooking data communications system as claimed in claim 16, in which the central communications system is a web-server and communications between each cooking apparatus and the central communications controller is via the Internet.

19. A cooking data communications system as claimed in claim 16, in which the cooking apparatus comprises a GSM/GPRS modem to enable communications with the central communications server.

20. A cooking data communications system as claimed in claim 16, in which the cooking apparatus transmits the unique identifiers for all food items that have been cooked to the central communications server.

21. A cooking data communications system as claimed in claim 16, in which the central communications server is adapted to transmit a record comprising a unique identifier for a recalled food item into the memory of each cooking apparatus coupled to the network so that a cooking process is not able to be performed by any cooking apparatus in the network for the recalled food item.

22. A cooking data communications system as claimed in claim 16, in which the central communications server is adapted to transmit amended cooking data to the memory of each cooking apparatus coupled to the network so that a cooking process performed by the cooking apparatus is based on the amended cooking data instead of the cooking data originally applied to the food item.

* * * * *